July 22, 1952 W. A. J. GOVAN 2,604,199
CONVEYER LUBRICATOR
Filed Oct. 10, 1947 2 SHEETS—SHEET 1
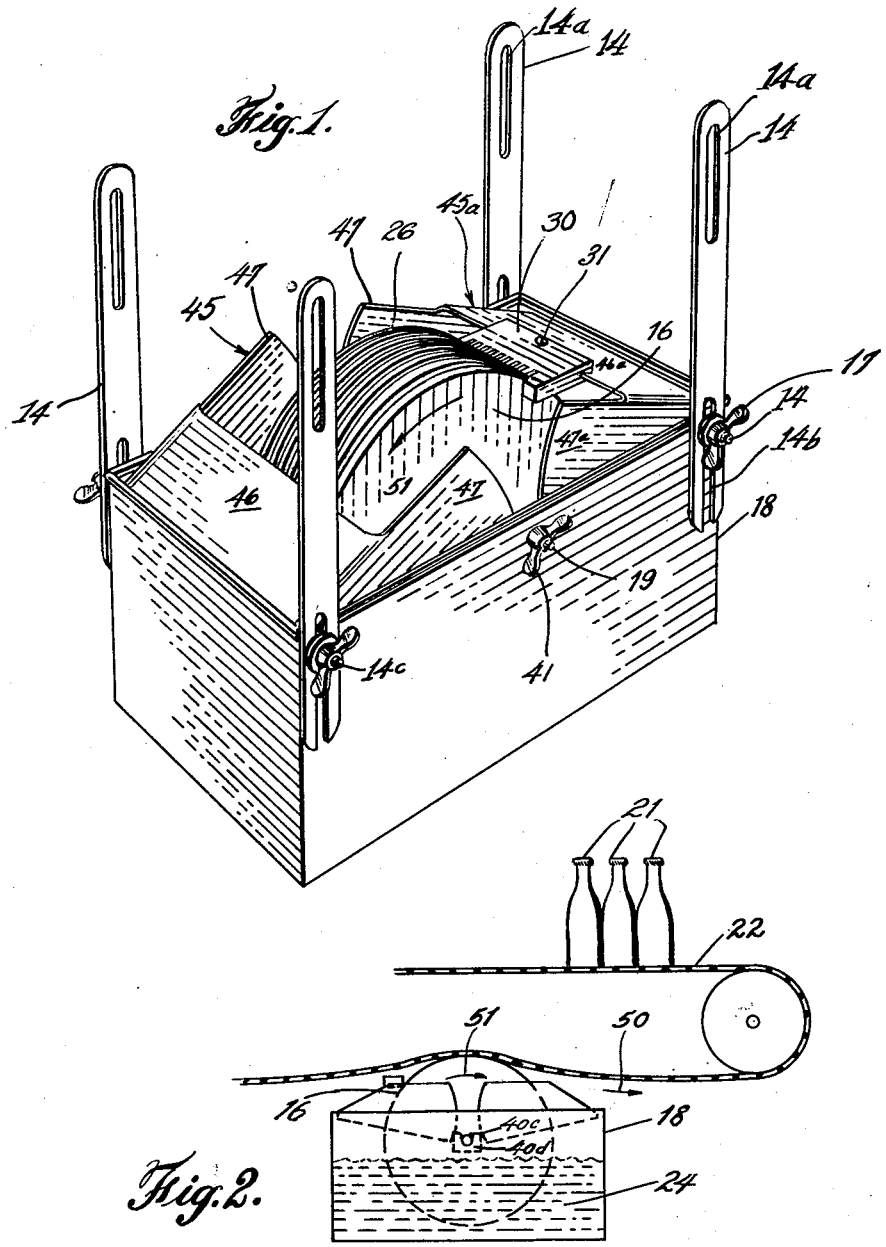
INVENTOR
W. ARTHUR J. GOVAN
BY
Ostrolenk & Faber
ATTORNEYS

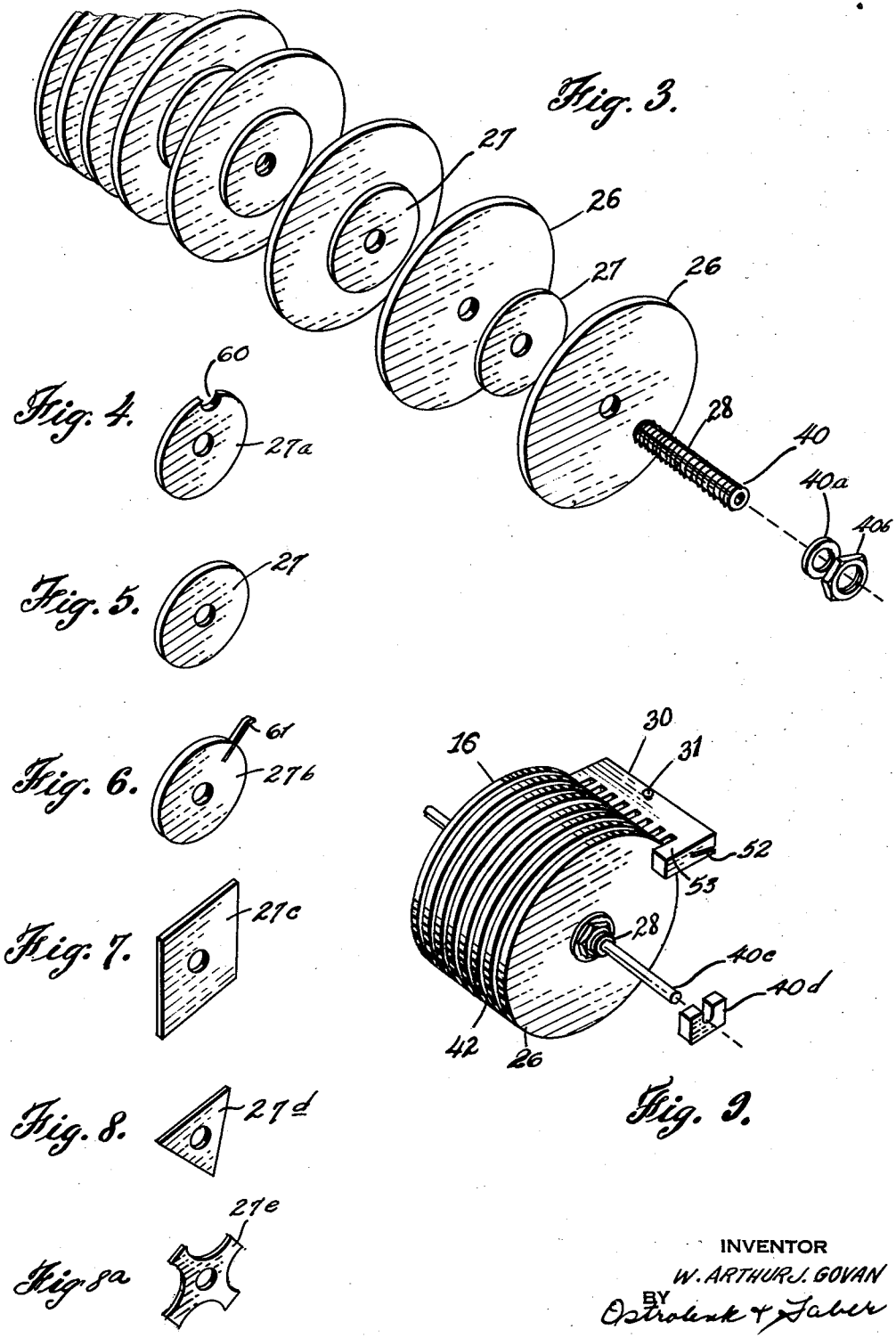

Patented July 22, 1952

2,604,199

UNITED STATES PATENT OFFICE 2,604,199

CONVEYER LUBRICATOR

William Arthur James Govan, Beachhurst, N. Y.

Application October 10, 1947, Serial No. 779,010

2 Claims. (Cl. 198—1)

My present invention relates to an attachment securable to the frame in which a conveyor operates in order to provide a simplified means for lubricating the conveyor.

More specifically, my invention relates to a lubricating attachment for the slat type conveyors used in bottling machinery.

In machines which are designed specifically for the filling and closing of bottles, it is customary to provide a plurality of conveyors and turntables so that the bottles may be rapidly carried in erect position to the filling point, moved on a turntable beneath the filling apparatus, and then rapidly carried away.

Similar types of feeding conveyors, turntable and delivery conveyors are used in connection with apparatus for closing the bottle after it is filled and in apparatus for labeling the bottle.

A simple machine may thus have at the minimum two conveyors and one turntable.

In order to ensure that the filling, closing or labeling apparatus receives a sufficient supply of bottles so that all of the operating elements thereof are continuously in use, it is customary to place an excess of bottles on the feed-in conveyor which delivers the bottles to the turntable on which the operations are performed.

The bottles, therefore, when they reach the turntable are held back by reason of the fact that they cannot enter the turntable until clearance is provided for them. The bottles must, therefore, stand still and hence must slide backwards with respect to the moving conveyor, the bottles closer to the turntable pushing back against the more remote bottles.

It has become customary to lubricate the conveyor so that the bottles may readily slide on the conveyor when thus held back or pushed back without tipping over. Since the conveyor is filled with bottles, any bottle which tips over may tip over a whole line of bottles progressively.

The necessity for a lubricant for the feed-in conveyor, the turntable, and the delivery conveyor has long been recognized. It has become customary to place a bar of lubricating soap on the conveyor just before the point at which the bottles reach the conveyor and to drip water on the soap so that the conveyor will be covered with a soap film on which the bottles may readily slide.

In the case of turntables, since only an arc of the order of 180° of the turntable is used for the operations on bottles, the bar of soap was placed in a holder traversed by the unused segment of the turntable in order to lubricate the turntable.

The combination of the bar of soap rubbing on the conveyor turntable with the water dripping thereon has created many difficulties. If there was an excess of water, the soap film was simply washed off. If the flow of water was too small in amount, then a heavy coating of soap was rubbed off on the conveyor, forming a lumpy mass which was likely to tip the bottles over in any event.

However, this type of lubricating means has remained the rule in bottling apparatus up to the present time. Various attempts have been made to improve the methods and means for applying lubricating soap to the conveyors and turntables in order to obviate the difficulties which arose in the case of the use of a simple replaceable bar of soap.

Thus, in the past attempts have been made to utilize a moving belt dipping into a soap solution and rubbing on the conveyor. However, it was found that an insufficient deposit of lubricant was thereby obtained.

My present invention is directed to the specific construction of an applicator designed to apply a film for lubricating purposes of the proper lubricating type on the conveyor or turntable.

Specifically, my invention contemplates the placement of a lubricating solution in a container supported below the conveyor adjacent the point where the conveyor turns around its sprocket into conveying position. The applicator which raises the lubricating fluid from the container to the conveyor and applies it to the conveyor itself is especially designed both to froth the solution and to apply the emulsified lubricant to the conveyor.

In order to accomplish this, my novel applicator comprises, instead of an applicating cylinder or roller, a plurality of discs spaced from each other; the spacers of special formation rotating in the fluid solution froths a sufficient portion thereof and raises the frothed portion of the fluid to the conveyor.

The spacers between the discs may be so shaped and constructed as to constitute additional means for agitating the solution in the container in order to form the froth.

The essential element of my invention is the application of the lubricant in a frothed form rather than as a mere liquid.

Thus, the primary object of my invention is the provision of a novel applicator for applying a lubricating solution in frothed form to a conveyor belt.

Another object of my invention is the provision of novel applicating means comprising a plurality of spaced discs rotating in a solution, frothing the same, and entrapping the froth at the periphery of the discs so that a significant quantity of lubricant may be raised to be deposited on the conveyor.

Another object of my invention is the provision, in association with the discs, of novel means for agitating the solution in the container in order to froth the same.

The utilization of a container and applicator so constructed as to include agitating means also provides by reason of this inclusion of agitating means elements which throw the lubricant from the container up to the surface of the conveyor. The discs in such case by engaging the conveyor provide the motive power for frothing of the fluid and transmission to the conveyor.

The applicator of the type above-described is more specifically adapted for application of the lubricant to the under side of the conveyor, preferably just before the conveyor makes the turn over the sprocket to the upper side.

The foregoing and many other objects of my invention will become apparent from the following description and drawings in which:

Figure 1 is a view in perspective of my novel applicator.

Figure 2 is a schematic view showing the method of cooperation between my novel applicator and a conveyor.

Figure 3 is an exploded view of my novel composite applicator roller showing the arrangement thereof as a plurality of spaced discs.

Figures 4, 5, 6, 7, and 8 are views in perspective of different types of spacers between the discs of the applicator of Figure 3 for agitating the soap solution in the container.

Figure 8a is a view of the preferred form of spacer.

Figure 9 is a view in perspective of the applicator roller itself showing also the metering or controlling device for regulating the amount of lubricant conveyed by the applicators.

Referring first to Figure 1, my novel applicator comprises a container 18 for a lubricating solution. A composite applicator 16, including a plurality of individual spaced discs 26 is mounted on the shaft 19 held between the side walls of the container 18.

The applicator 16, as shown in Figures 3 and 9, comprises a sleeve shaft 28 rotatable on the shaft 40c and slidable laterally with respect thereto. A plurality of spaced discs 26 are secured on the sleeve shaft or bushing 28, the discs 26 being spaced from each other by the spacers 27 to produce a plurality of gaps 42. The spacers 27 are preferably shaped to produce when rotated a frothing action in the fluid.

The discs 26 and spacers 27 are held on shaft 28 by the nuts 40a and washers 40b on the threaded ends of shaft 28. Shaft 40c passes through the longitudinal opening of shaft 28 so that the applicator 11 is rotatable thereon and slidable laterally thereon. The shaft 40c is removably mounted in U-shaped hanger bearings 40d secured to the interior of the side walls of the container.

The applicator 16 is thus readily removable by simply lifting it out for adjustment, replacement, repair or cleaning. The number of discs and spacers on sleeve shaft 28 may be varied. For this purpose, shaft 2 may be threaded along its whole length to provide for maximum variation in the number of discs and spacers.

The container is mounted beneath the conveyor 22 as shown schematically in Figure 2 by the mounting straps 14 secured to any stationary part of the frame of the machine.

The upper ends of straps 14 are provided with slots 14a to facilitate the mounting thereof on the frame. The lower parts of the straps 14 are provided with open ended slots 14b through which bolts 14c carried by the side walls of the container 18 may be passed. Wing nuts 17 tightened on the bolts 14c secure the container 18 in position at the lower end of straps 14. The open ended slots 14b permit the withdrawal of the container 18 for cleaning the same when necessary without disturbing the securement of the straps 14 on the main frame. The slots 14a and 14b permit vertical adjustment of the container and applicator.

Appropriate driving friction against the discs 26 is obtained by adjusting the container to a height (as seen in Figure 2) where the conveyor is partially wrapped around the discs 26. The container may be adjusted higher or lower as required to obtain proper driving friction.

The upper end of the container carries hinged to the end walls thereof the shields 45, 45. These shields 45 are preferably hinged on bolts 14c which preferably constitute continuous rods threaded at the ends and passing through the container laterally at each end.

The shields 45 and 45a comprise a top section 46 and side sections 47, 47. The shield 45 is arranged so that it will confine the froth to the interior of the container.

Shield 45a on the pick-up side of the applicator serves two purposes: One, that of locating and adjusting the lateral position of applicator 16 on shaft 40c by means of the guides on the comb structure 30; two, by adjusting the angular position of shield 45a, the comb structure 30 is moved into spaces 42 or retracted therefrom to control the amount of froth picked by the frothing spacers.

The angular position, up or down of shield 45a, as well as of shield 45, is adjustably fixed by wing nut 41 on bolt 19 which has an interior clamping head extending beyond the sides 47 of the shields. Turning of wing nut 41 pulls the bolt 19 and its clamping head up against sides 47 to clamp them between the clamping head of bolt 19 and the inside of the container.

The shields 45 may readily be lifted to permit the applicator 16 to be withdrawn.

When the applicator is mounted beneath the conveyors as shown schematically in Figure 2, then the solution 24 in the container 18 is frothed by the rotation of spacers or emulsifiers 27 which pick up frothed lubricant and transmit it to the side of conveyor 22.

The bottles 21 riding on the conveyor 22 may now slide with respect to the conveyor when halted by an extraneous object without tipping over. When the extraneous force or object which halts the bottles is removed, then the bottles are carried forward by the conveyor 22.

The lubricant is thus of such nature that it will not interfere with the movement of the bottles with the conveyor while no extraneous force halts the bottles; but it will permit the bottles to slide with respect to the conveyor when such extraneous force exists.

Thus, the primary feature of the present invention is that the arrangement of the applicator motivating discs 26 which contact the conveyor and provide the power for rotating the spacer emulsifiers 27 which froth the liquid and transmit it to the conveyor.

The spacer frothers 27 may be given various shapes to enhance both the frothing action and lubricant applicating action. Thus, instead of being round as in Figures 3 and 5, one or more detents 60 may be cut in the rim of spacers 27a as shown in Figure 4; or an extending finger 61 may be embedded in the spacers 27b of Figure 6; or the spacers 27c of Figure 7 may be in a square form; or the spacers 27d of Figure 8 may be triangular in form.

In Figure 8a I have shown a preferred star wheel form of spacer 27e. Other irregular shapes may, of course, be used.

Various combinations of shapes of spacers may be used in the same applicator at the same time.

The frothing action of the spacers 27a of Figure 4 may be enhanced by arranging the spacers 27a so that the detents 60 are not aligned with each other.

The same principle is applicable to the stirring finger or extension 61 of spacers 27b. These fingers may be staggered annularly with respect to each other in different spacers to produce a steady frothing and transmitting action.

Likewise, in the use of spacers 27c of Figure 7 or 27b of Figure 8, these spacers may be so arranged that the sides of adjacent spacers are not parallel to each other and so that the corners of the spacers are staggered annularly to produce a constant frothing.

In addition, to achieve the froth, the discs 26 may be inclined on their sleeve shaft 28 so that they are not absolutely normal thereto.

For this purpose, the spacers may be thicker on one side than on the other to permit arrangement of the discs 26 so that they are inclined to the normal; and the discs 26 need not necessarily all be parallel to each other but may be inclined at slightly different angles. This too will produce a very efficient emulsification of the solution.

In the foregoing I have described my invention in connection with a specific novel applicator adapted to apply a lubricant in emulsified form to the under side of a conveyor. Many variations and modifications of my invention will be obvious to those skilled in the art. In addition, however, it may be necessary in certain types of application to apply the lubricant directly to the top of the conveyor or a turntable.

In the foregoing, I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. A conveyor and an applicator for frothing and applying a frothable lubricant to the surface of said conveyor, said applicator comprising a container for the lubricant; a composite roller comprising a plurality of spaced discs rotatably mounted in said container and extending above the top thereof to bear against the surface to which lubricant is to be applied; said composite roller being rotated by the movement of said surface with respect to the container; spacers between said discs; said spacers having an irregular conformation to froth lubricant in the container; said spacers transmitting the frothed lubricant to the conveyor between the driving discs.

2. An applicator for applying lubricant to the under surface of a conveyor and the like, said applicator comprising a container for the lubricant; a composite roller comprising a plurality of spaced discs rotatably mounted in said container and extending above the top thereof to bear against the surface to which lubricant is to be applied; said composite roller being rotated by the movement of said surface with respect to the container; said composite roller being removably mounted in said container; a pair of shields covering the end portions of said container; the roller projecting between them; said composite roller being laterally movable in said container; a guide member comprising a plurality of teeth entered between the discs and maintaining said roller in position; said guide member controlling the amount of lubricant transmitted to the conveyor; said guide member being removably mounted on a shield on the side of the container approached by the discs before they have engaged the surface to which lubricant is applied.

W. ARTHUR J. GOVAN.

REFERENCES CITED

The following references are of record in the file of this patent:

UNITED STATES PATENTS

| Number | Name | Date |
| --- | --- | --- |
| 1,180,708 | Fegbusch | Apr. 25, 1916 |
| 1,191,537 | Schall | July 18, 1916 |
| 1,395,056 | Nelson | Oct. 25, 1921 |
| 1,615,778 | Walstead | Jan. 25, 1927 |
| 1,679,717 | Greer | Aug. 7, 1928 |
| 1,967,751 | Goerlich | July 24, 1934 |
| 2,231,748 | Clement | Feb. 11, 1941 |
| 2,241,104 | Grinten | May 6, 1941 |
| 2,357,679 | Moench | Sept. 5, 1944 |
| 2,367,354 | Kanter | Jan. 16, 1945 |